US012761084B2

(12) United States Patent

Kubo et al.

(10) Patent No.: US 12,761,084 B2

(45) Date of Patent: Oct. 13, 2026

(54) ELECTRONIC APPARATUS TO IMPROVE ACCURACY OF ESTIMATION OF AMBIENT TEMPERATURE AND CONTROL METHOD

(71) Applicant: CANON KABUSHIKI KAISHA, Tokyo (JP)

(72) Inventors: Yuki Kubo, Kanagawa (JP); Yuji Ueda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 374 days.

(21) Appl. No.: 18/604,169

(22) Filed: Mar. 13, 2024

(65) Prior Publication Data

US 2024/0310219 A1 Sep. 19, 2024

(30) Foreign Application Priority Data

Mar. 16, 2023 (JP) ................................ 2023-042317

(51) Int. Cl.

*G01K 3/10* (2006.01)
*G01K 7/42* (2006.01)
*H04N 23/65* (2023.01)

(52) U.S. Cl.

CPC ............... *G01K 3/10* (2013.01); *G01K 7/427* (2013.01); *H04N 23/65* (2023.01)

(58) Field of Classification Search

CPC .. G01K 1/20; G01K 3/10; G01K 7/25; G01K 7/42; G01K 7/427; H04N 23/65

See application file for complete search history.

(56) References Cited

U.S. PATENT DOCUMENTS

| | | | | |
|---|---|---|---|---|
| 10,520,368 B2 * | 12/2019 | Ishii | ......................... | G01K 7/25 |
| 2015/0003491 A1 * | 1/2015 | Matsumoto | .............. | G01K 1/20 374/1 |
| 2016/0187272 A1 * | 6/2016 | Ishii | ......................... | G01K 7/42 702/136 |
| 2018/0136051 A1 * | 5/2018 | Ishii | ......................... | G01K 1/20 |

FOREIGN PATENT DOCUMENTS

| | | |
|---|---|---|
| JP | 6703273 B2 | 6/2020 |

* cited by examiner

*Primary Examiner* — Randy W Gibson

(74) *Attorney, Agent, or Firm* — Canon U.S.A., IP Division

(57) ABSTRACT

In a case where the first time period is longer than the second time period, the electronic apparatus obtains the first temperature as an estimated ambient temperature. In a case where a first time period that is a time period from when the electronic apparatus has been placed in the power-OFF state until when the electronic apparatus has been switched to the power-ON state is not longer than a second time period being a time period required for the first temperature to decrease to an ambient temperature after the electronic apparatus has been placed in the power-OFF state, the electronic apparatus obtains the estimated ambient temperature based on the first temperature and on a temperature difference between the first temperature and the ambient temperature corresponding to a time difference between the first time period and the second time period.

12 Claims, 7 Drawing Sheets

ELECTRONIC APPARATUS TO IMPROVE ACCURACY OF ESTIMATION OF AMBIENT TEMPERATURE AND CONTROL METHOD

BACKGROUND

Technical Field

One disclosed aspect of the embodiments relates to a technique to improve the accuracy of estimation of the ambient temperature in an electronic apparatus.

Description of the Related Art

In an electronic apparatus such as a digital camera, with an increase in the load on image capture processing and image processing caused by, for example, an increase in the resolution of shot images, electronic devices (hereinafter, heat source devices) that comprise an image capturing unit, a control unit, and the like generate heat at the time of shooting, thereby raising the temperatures of the inside of a housing and an outer casing. For this reason, it is necessary to take measures, such as the International Electrotechnical Commission (IEC) 62368 to restrict operations of the electronic apparatus so as not to exceed a temperature at which operations of the heat source devices are guaranteed, and to restrict operations of the electronic apparatus in order to prevent an excessive increase in the temperature of the outer casing, which is touched directly by a user.

According to Japanese Patent No. 6703273, the ambient temperature is estimated using the temperatures detected in the vicinity of heat source devices, a reference temperature detected at a position that is distanced from the heat source devices, and a plurality of transfer functions.

However, when a housing is small, as in the case of a small electronic apparatus, the configuration of Japanese Patent No. 6703273 may lead to a case where there is no difference among the temperatures detected by a plurality of thermometers inside the housing, and a plurality of transfer functions cannot be prepared. Furthermore, as it is necessary to prepare as many thermometers as there are heat source devices, a problem also arises in which the number of components increases and the cost of the components rises.

SUMMARY

One embodiment has been made in consideration of the aforementioned problems, and realizes techniques to improve the accuracy of estimation of the ambient temperature using a method that is simpler than conventional methods, thereby allowing an appropriate temperature to be set as an operation restriction temperature for an electronic apparatus.

In order to solve the aforementioned problems, the disclosure provides an electronic apparatus including a first thermometer, a processor, and a memory. The first thermometer detects a first temperature corresponding to an ambient temperature of an environment in which the electronic apparatus is used. The memory stores a program that, when executed by the CPU, causes the electronic apparatus to function as an obtainment unit and a temperature estimation unit. When the electronic apparatus has been switched from a power-OFF state to a power-ON state, the obtainment unit obtains a first time period that is a time period from when the electronic apparatus has been placed in the power-OFF state until when the electronic apparatus has been switched to the power-ON state. When the electronic apparatus has been switched to the power-ON state, the temperature estimation unit obtains an estimated ambient temperature by estimating an ambient temperature based on a second time period and on the first temperature, the second time period being a time period required for the first temperature to decrease to an ambient temperature after the electronic apparatus has been placed in the power-OFF state. In a case where the first time period obtained by the obtainment unit is longer than the second time period, the temperature estimation unit obtains the first temperature as the estimated ambient temperature. In a case where the first time period obtained by the obtainment unit is not longer than the second time period, the temperature estimation unit obtains the estimated ambient temperature based on the first temperature and on a temperature difference between the first temperature and the ambient temperature corresponding to a time difference between the first time period and the second time period.

In order to solve the aforementioned problems, the disclosure provides a control method for an electronic apparatus. The electronic apparatus includes a first thermometer that detects a first temperature corresponding to an ambient temperature of an environment in which the electronic apparatus is used. The control method includes at least two operations. When the electronic apparatus has been switched from a power-OFF state to a power-ON state, the method obtains a first time period that is a time period from when the electronic apparatus has been placed in the power-OFF state until when the electronic apparatus has been switched to the power-ON state. When the electronic apparatus has been switched to the power-ON state, the method obtains an estimated ambient temperature by estimating an ambient temperature based on a second time period and on the first temperature detected by the first thermometer. The second time period is a time period required for the first temperature to decrease to an ambient temperature after the electronic apparatus has been placed in the power-OFF state. In a case where the first time period is longer than the second time period, the method obtains the first temperature as the estimated ambient temperature. In a case where the first time period is not longer than the second time period, the method obtains the estimated ambient temperature based on the first temperature and on a temperature difference between the first temperature and the ambient temperature corresponding to a time difference between the first time period and the second time period.

According to the disclosure, the accuracy of estimation of the ambient temperature is improved by using a method that is simpler than conventional methods, thereby allowing an appropriate temperature to be set as an operation restriction temperature for an electronic apparatus.

Further features of the disclosure will become apparent from the following description of exemplary embodiments (with reference to the attached drawings).

DESCRIPTION OF THE EMBODIMENTS

Hereinafter, embodiments of the disclosure will be described in detail based on the attached drawings. Note that the embodiments described below are examples for realizing the disclosure; corrections or changes are to be made as appropriate depending on the configuration of an apparatus to which the disclosure is applied and on various conditions, and the following embodiments are not intended to limit the disclosure. Furthermore, it is permissible to adopt a configuration in which parts of the embodiments described below are combined as appropriate.

In the present embodiment, an outer casing temperature and an ambient temperature are detected by temperature detection units that are placed on a housing of an electronic apparatus at positions distanced from each other, and control to restrict the operations of the electronic apparatus is executed when the outer casing temperature has reached an operation restriction temperature that has been set based on an estimated ambient temperature. Also, in the present embodiment, when the power of the electronic apparatus has been switched from OFF to ON, when a time period in which the power has been OFF is longer than a predetermined cooling time period, it is determined that the inside of the housing has been sufficiently cooled, and a temperature detected by a temperature detection unit is set as the estimated ambient temperature. Furthermore, when the time period in which the power has been OFF is shorter than the predetermined cooling time period, it is determined that the inside of the housing has not been sufficiently cooled, and the estimated ambient temperature is calculated by correcting a temperature detected by a temperature detection unit in accordance with the time period in which the power has been OFF. In this way, the accuracy of estimation of the ambient temperature can be improved using a method that is simpler than conventional methods, and an appropriate temperature can be set as an operation restriction temperature for the electronic apparatus, thereby extending an operable time period of the electronic apparatus to the fullest.

The following embodiment will be described in relation to a case where an electronic apparatus of the disclosure is an image capture apparatus such as a digital camera. Note that the electronic apparatus of the disclosure is not limited to the digital camera, and an application to a handheld apparatus including a device that acts as a heat source—such as a personal computer (PC) (e.g., a notebook PC or a tablet PC) and a smartphone—is possible.

<Apparatus Configuration>

Figure 1A:
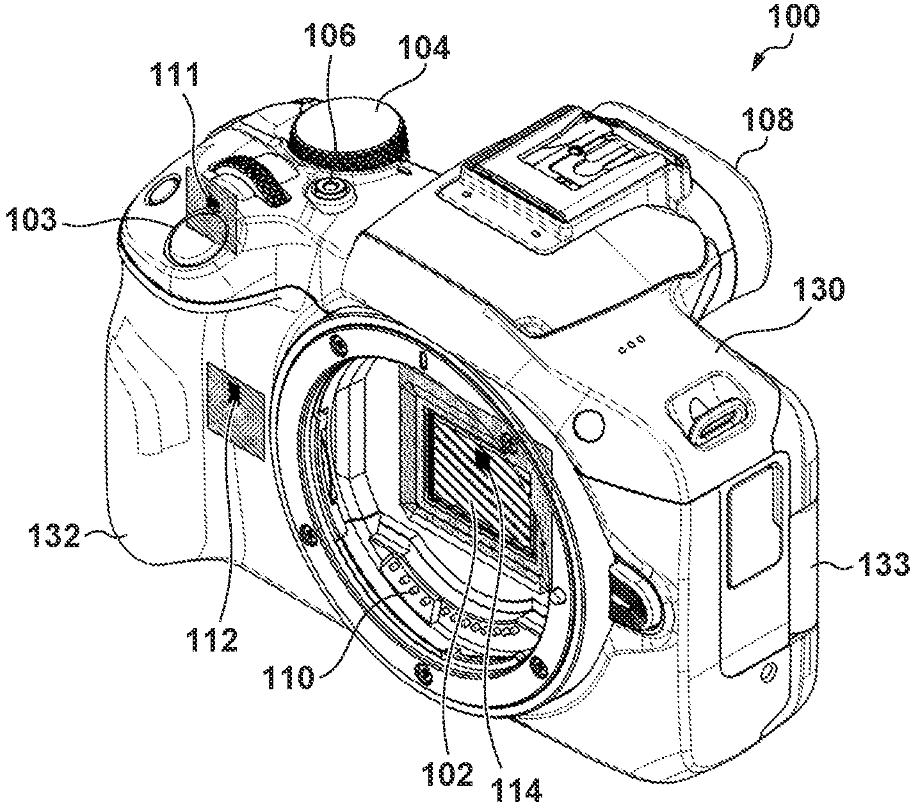
FIGS. 1A and 1B are external views of an electronic apparatus according to the present embodiment.
Figure 1B:
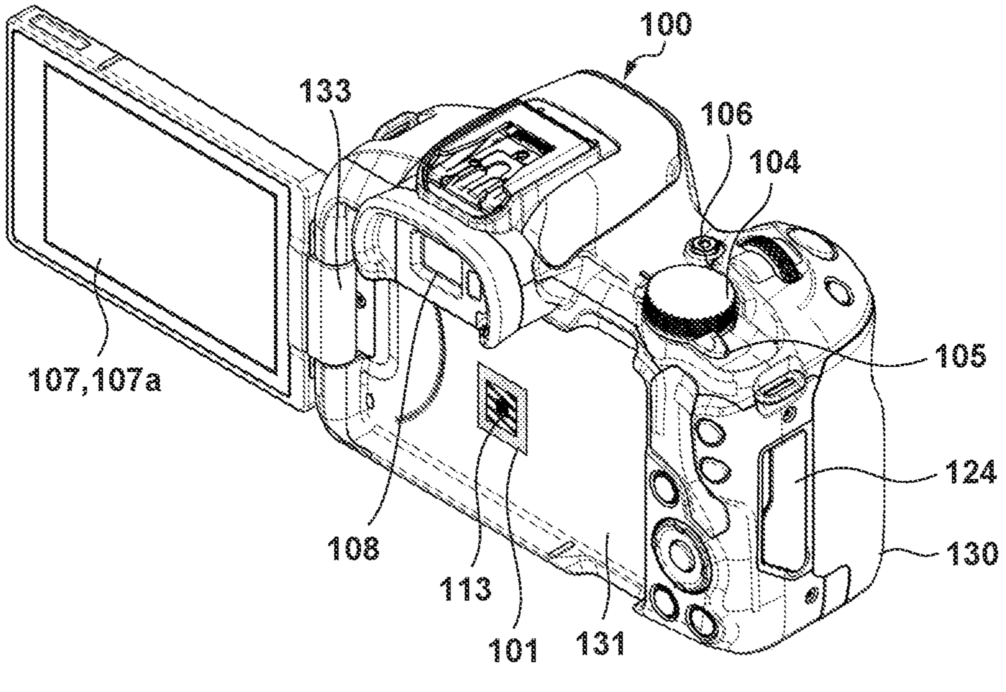
Figure 2:
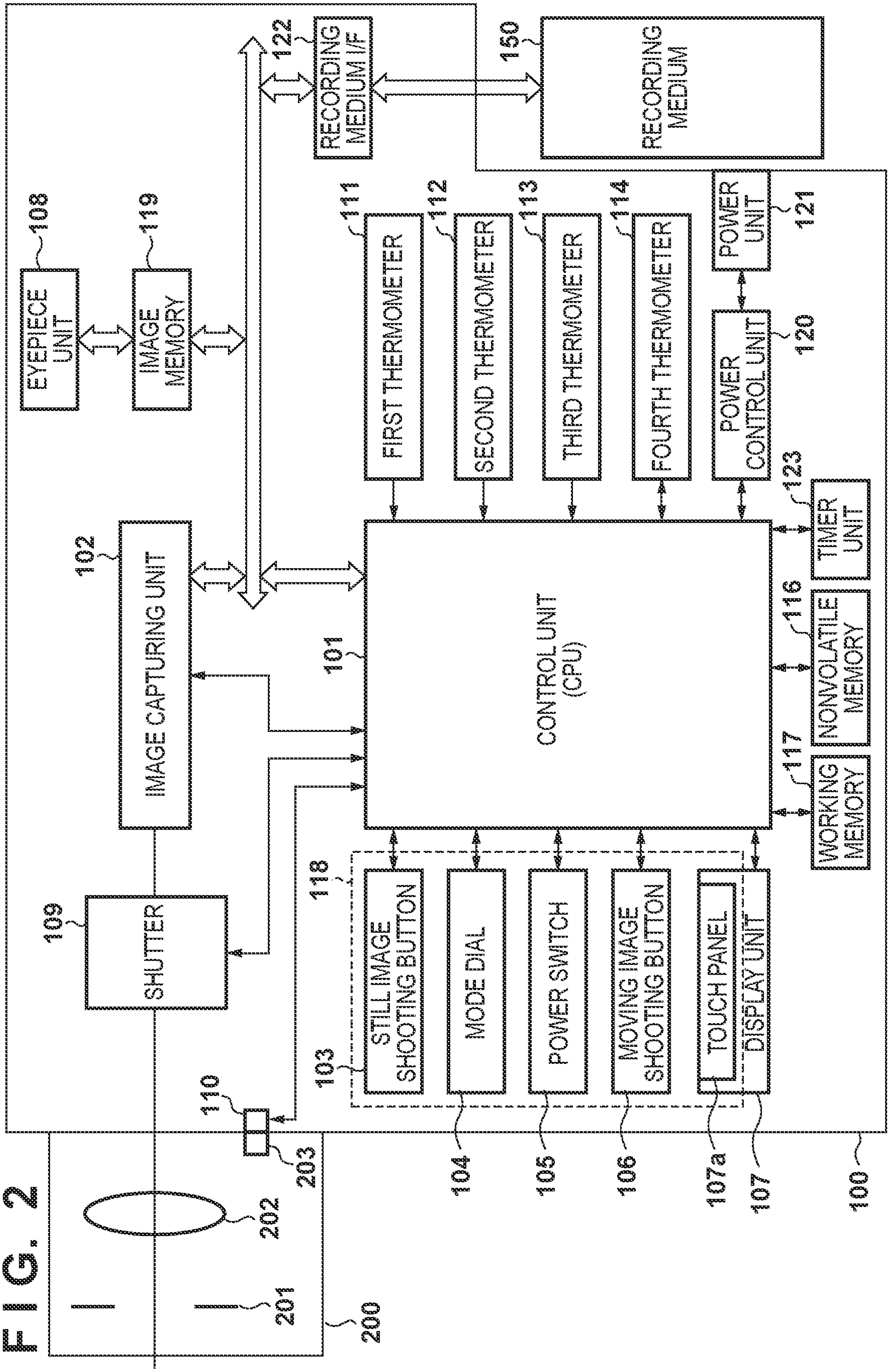
FIG. 2 is a block diagram showing a configuration of the electronic apparatus according to the present embodiment.

A description is now given of a configuration and functions of a digital camera 100 according to the present embodiment with reference to FIG. 1A to FIG. 2.

FIG. 1A is a front perspective view of the digital camera 100 in a state where a lens unit 200 has been detached, and FIG. 1B is a rear perspective view of the digital camera 100.

The digital camera 100 includes a control unit 101 and an image capturing unit 102 that are mounted on a substrate arranged inside a housing of a camera body 130, and a still image shooting button 103, a mode dial 104, a power switch 105, a moving image shooting button 106, a display unit 107, and an eyepiece unit 108 that are arranged on an outer casing of the camera body 130. Also, the digital camera 100 includes a first thermometer 111, a second thermometer 112, a third thermometer 113, and a fourth thermometer 114.

The control unit 101 includes a processor that executes computation processing and control processing related to the digital camera 100, such as a central processing unit (CPU). The image capturing unit 102 is an image sensor comprised of an image capture element that converts a subject image into electrical signals, such as a charge coupled device (CCD) or a complementary metal oxide semiconductor (CMOS) device.

The still image shooting button 103 is a push-button operation member for issuing an instruction for still image shooting processing to the control unit 101.

The mode dial 104 is a rotary operation member for switching among various types of modes. The mode dial 104 can switch from a plurality of operation modes of the control unit 101 to a still image shooting mode or a moving image shooting mode.

The power switch 105 is a rotary operation member that switches between ON and OFF of the power of the digital camera 100.

The moving image shooting button 106 is a push-button operation member for issuing an instruction for starting or stopping moving image shooting processing (recording processing) to the control unit 101. The control unit 101 starts the moving image shooting processing in response to pressing of the moving image shooting button 106 during the suspension of moving image shooting, and continues the moving image shooting processing until the moving image shooting button 106 is pressed again. Also, the control unit 101 stops the moving image shooting processing when the moving image shooting button 106 has been pressed again, and records moving images corresponding to a time period from the start to the stop of the shooting processing into a recording medium 150.

The display unit 107 includes, for example, a liquid crystal panel or an organic EL panel provided on the rear surface side of the camera body 130, and displays images and various types of information so that they can be viewed by a user. The display unit 107 has an electronic viewfinder (EVF) function that displays live-view images captured by the image capturing unit 102. Furthermore, the display unit 107 has an electronic viewfinder (EVF) function that reproduces shot still images and displays moving images that are currently recorded. The display unit 107 is a vari-angle monitor which is rotatably connected to the camera body 130 via a hinge unit 133, and which is positionally variable relative to the camera body 130. The user can freely change the direction and angle of, or rotate, a display surface of the vari-angle monitor relative to the digital camera 100. Note that the display unit 107 is not limited to the above-described vari-angle type, and may be of a tilt type which allows rotation in an up-down direction (around a horizontal axis perpendicular to an optical axis) using the hinge unit 133 as a rotation shaft, and which allows the display surface to tilt relative to a vertical direction.

FIG. 1A shows a state where the display unit 107 is at a "closed position". The "closed position" is a stored form where the display surface of the display unit 107 has been closed so as to face a rear surface cover 131 of the camera body 130. FIG. 1B shows a state where the display unit 107 is at an "open position". The "open position" is an open form where the display unit 107 has been opened toward the outside of the camera body 130 from the "closed position", and the display surface faces the same direction as the rear surface cover 131 of the camera body 130 (a direction opposite to the non-illustrated lens unit).

Furthermore, the display unit 107 includes a touch panel 107_a_. The touch panel 107_a_ includes a touch sensor capable of detecting a contact (a touch operation) made on the display surface of the display unit 107 (an operation surface of the touch panel 107_a_).

The eyepiece unit 108 is a look-through type eyepiece viewfinder. Via the eyepiece unit 108, the user can confirm the focus and composition of a subject in an image captured by the image capturing unit 102.

A communication terminal 110 is an electrical contact point that allows the digital camera 100 to communicate with the non-illustrated lens unit.

The first thermometer 111 includes a temperature sensor such as a thermistor. The first thermometer 111 detects a first temperature T1 for obtaining the ambient temperature, which corresponds to the temperature of the environment in which the camera body 130 is used. The first thermometer 111 is arranged at a position that is distanced from the control unit 101 and the image capturing unit 102 by a predetermined distance (e.g., in the vicinity of the still image shooting button 103). The control unit 101 and the image capturing unit 102 are arranged inside the housing of the camera body 130. The control unit 101 and the image capturing unit 102 are devices that generate heat as a result of the digital camera 100 operating in the power-ON state (hereinafter, heat source devices). The first thermometer 111 is arranged at a position that is distanced from these heat source devices by a predetermined distance.

The second thermometer 112 includes a temperature sensor such as a thermistor. The second thermometer 112 detects a second temperature T2, which corresponds to an outer casing temperature of the camera body 130. The second thermometer 112 is placed so that the temperature detected by the second thermometer 112 has a correlation with the temperature of a position that exhibits the highest temperature due to heat generation of the heat source devices out of a section in which the user touches the camera body 130 to hold the digital camera 100. In the present embodiment, the second thermometer 112 is arranged in the vicinity of a grip 132, for example.

The third thermometer 113 and the fourth thermometer 114 are device temperature detection sensors that detect device temperatures associated with heat generation of the heat source devices.

The third thermometer 113 includes a temperature sensor such as a thermistor. The third thermometer 113 detects a third temperature T3 associated with heat generation of the control unit 101, which is the heat source device. The third thermometer 113 is mounted on the substrate arranged inside the housing of the camera body 130. The control unit 101 is mounted on this substrate. On this substrate, the third thermometer is arranged in the vicinity of the control unit 101.

The fourth thermometer 114 includes a temperature sensor such as a thermistor. The fourth thermometer 114 detects a fourth temperature T4 associated with heat generation of the image capturing unit 102, which is the heat source device. The fourth thermometer 114 is arranged inside the housing of the camera body 130 so as to be in the vicinity of the image capturing unit 102.

Each of the control unit 101 and the image capturing unit 102 generates heat as a result of the digital camera 100 operating in the power-ON state. The amounts of heat generation of the control unit 101 and the image capturing unit 102 are proportional to power consumed by the control unit 101 and the image capturing unit 102, and the amounts of heat generation increase with an increase in consumed power. Also, power consumed by the control unit 101 and the image capturing unit 102 varies depending on an operation mode of the digital camera 100. For example, power consumed during shooting of moving images at a high frame rate (e.g., 120 fps) is higher than power consumed during shooting of moving images at a low frame rate (e.g., 30 fps). Therefore, the amounts of heat generation of the heat source devices during shooting of moving images at a high frame rate are larger than the amounts of heat generation of the heat source during shooting of moving images at a low frame rate. During shooting of moving images, the temperature inside the housing of the digital camera 100 increases with the elapse of time. Furthermore, during shooting of still images, consumed power is low and the amounts of heat generation of the heat source devices are small compared to those during shooting of moving images at a high frame rate, although they vary depending on, for example, the recording size (file format) of shot images, the frame speed in continuous shooting, and the number of continuously-shot images. Therefore, during shooting of still images, the extent of the increase in the temperature inside the housing of the camera body 130 of the digital camera 100 is smaller than that during shooting of moving images.

Next, with reference to FIG. 2, internal configurations of the digital camera 100 and the lens unit 200 according to the present embodiment will be described. In FIG. 2, configurations that are the same as those in FIGS. 1A and 1B are given the same reference signs.

The lens unit 200 includes a diaphragm 201 and a shooting lens 202, and is attachable to and detachable from the digital camera 100. The shooting lens 202, though normally comprised of a plurality of lenses, is illustrated here as only one lens for the sake of simplicity.

A communication terminal 203 is an electrical contact point that allows the lens unit 200 to communicate with the digital camera 100. The communication terminal 203 of the lens unit 200 is electrically connected to the communication terminal 110 of the digital camera 100 in a state where the lens unit 200 is attached to the camera body 130 of the digital camera 100. The control unit 101 of the digital camera 100 controls the diaphragm 201 and the shooting lens 202 by communicating with the lens unit 200 via the communication terminals 110 and 203.

The control unit 101 includes a processing circuit having at least one processor and at least one circuit and realizes each of the functions of the digital camera 100, including each type of processing of a later-described flowchart, by executing a program stored in a nonvolatile memory 116 to cause the digital camera 100 to function as functional units described in the following. A working memory 117 is a RAM or the like; constants and variables for the operations of the control unit 101, the program that has been read out from the nonvolatile memory 116, and the like are loaded thereto.

A focal-plane shutter 109 is capable of freely controlling an exposure time period of the image capturing unit 102 in accordance with an instruction from the control unit 101.

The nonvolatile memory 116 is an electrically erasable and programmable read-only memory (EEPROM) or the like, for example. Constants for the operations of the control unit 101, the program, and the like are stored in the nonvolatile memory 116. The program according to the present embodiment refers to a program for executing the flowchart that will be described later using FIGS. 4A, 4B, and 5.

Also, the control unit 101 executes predetermined pixel interpolation, resize processing such as reduction, and color conversion processing with respect to image data captured by the image capturing unit 102. Furthermore, the control unit 101 executes computation processing using image data captured by the image capturing unit 102, and performs automatic exposure (AE) control and autofocus (AF) control based on the result of the computation.

In the still image shooting mode, the control unit 101 starts the AE control and the AF control when the still image shooting button 103 has been pressed halfway. Also, the control unit 101 executes still image shooting processing in which image data captured by the image capturing unit 102 is recorded into the recording medium 150 when the still image shooting button 103 has been fully pressed.

Furthermore, in the moving image shooting mode, the control unit 101 starts moving image shooting processing in response to initial pressing of the moving image shooting button 106 during the suspension of moving image shooting. Once the moving image shooting processing has been started, the control unit 101 performs the AE control and the AF control with respect to moving image data captured by the image capturing unit 102, continues the moving image shooting processing in which moving images are recorded into the recording medium 150, and stops the moving image shooting processing when the moving image shooting button 106 has been pressed again.

An operation unit 118 represents operation members, such as various types of switches and buttons, that accept various types of operations from the user and provide notifications to the control unit 101. The operation unit 118 includes at least the still image shooting button 103, the mode dial 104, the power switch 105, the moving image shooting button 106, and the touch panel 107*a*.

An image memory 119 stores image data captured by the image capturing unit 102 and data for image display, which is to be displayed on the display unit 107 or the eyepiece unit 108. The image memory 119 has a storage capacity that is sufficient to store a predetermined number of still images, and moving images and audio of a predetermined time period.

A power control unit 120 is comprised of, for example, a battery detection circuit, a DC-DC converter, and a switch circuit for switching a block to which current is supplied, and detects whether a battery has been loaded, a type of the battery, and a remaining battery level. The power control unit 120 also controls the DC-DC converter based on the results of such detections and on an instruction from the control unit 101 so as to supply necessary voltages to the respective components, including the recording medium 150, for a necessary time period.

A power unit 121 is used as a power source for the digital camera 100, and is comprised of a primary battery such as an alkaline battery and a lithium battery, a chargeable secondary battery such as a NiCd battery, a NiMH battery, and a Li-ion battery, or the like. A recording medium I/F 122 is an interface with the recording medium 150, which is a memory card, a hard disk, or the like. The recording medium 150 is a recording medium, such as a memory card, for recording still images or moving images in the still image shooting processing or the moving image shooting processing, and is comprised of a semiconductor memory, a magnetic disk, or the like.

A timer unit 123 includes a real-time clock (RTC), and generates time information in response to a request from the control unit 101. In the present embodiment, time information includes information related to a date and time.

<Ambient Temperature Estimation Method>

Next, with reference to FIG. 3, a method of calculating an estimated ambient temperature Tout based on the first temperature T1 detected by the first thermometer 111 will be described.

Figure 3A:
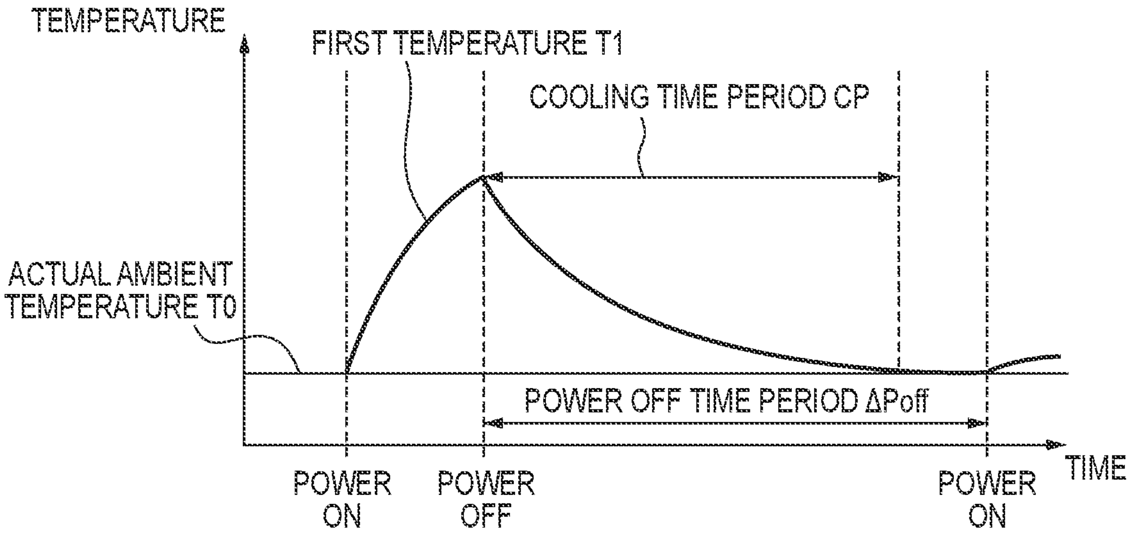
FIGS. 3A and 3B are diagrams illustrating a method of calculating an estimated ambient temperature according to the present embodiment.

FIG. 3A shows examples of changes in a real ambient temperature (actual ambient temperature) T0 and the first temperature T1.

It is assumed that the actual ambient temperature T0 is constant until the power of the digital camera 100 is turned ON, and the first temperature T1 is the same as the actual ambient temperature T0 until the power is turned ON.

Next, when the power of the digital camera 100 has been switched from OFF to ON, the control unit 101 and the image capturing unit 102, which are the heat source devices of the digital camera 100, start operating; as a result, the temperature inside the housing of the camera body 130 of the digital camera 100 starts to rise.

Next, when the power of the digital camera 100 has been switched from ON to OFF, the control unit 101 and the image capturing unit 102, which are the heat source devices, stop operating, and the temperature inside the housing of the camera body 130 of the digital camera 100 starts to decrease. In this case, the longer the time period that has elapsed since the power-OFF, the smaller the difference between the first temperature T1 and the actual ambient temperature T0. If the power remains OFF, the first temperature T1 decreases to the actual ambient temperature T0. In the present embodiment, it is assumed that a time period required for the first temperature T1 to reach the actual ambient temperature T0 since the power of the digital camera 100 has been turned OFF is a cooling time period CP. Furthermore, it is assumed that a time period from when the power of the digital camera 100 is turned OFF until when the power is turned ON is a power OFF time period ΔPoff.

In a case where the power OFF time period ΔPoff is equal to or longer than the cooling time period CP (ΔPoff≥CP), it can be estimated that the first temperature T1 has decreased to the actual ambient temperature T0. Therefore, the actual ambient temperature T0 can be calculated from the following Equation 1.

$$\text{Actual ambient temperature } T0 = \text{first temperature } T1\ (\Delta Poff \geq CP) \quad \text{(Equation 1)}$$

Figure 3B:
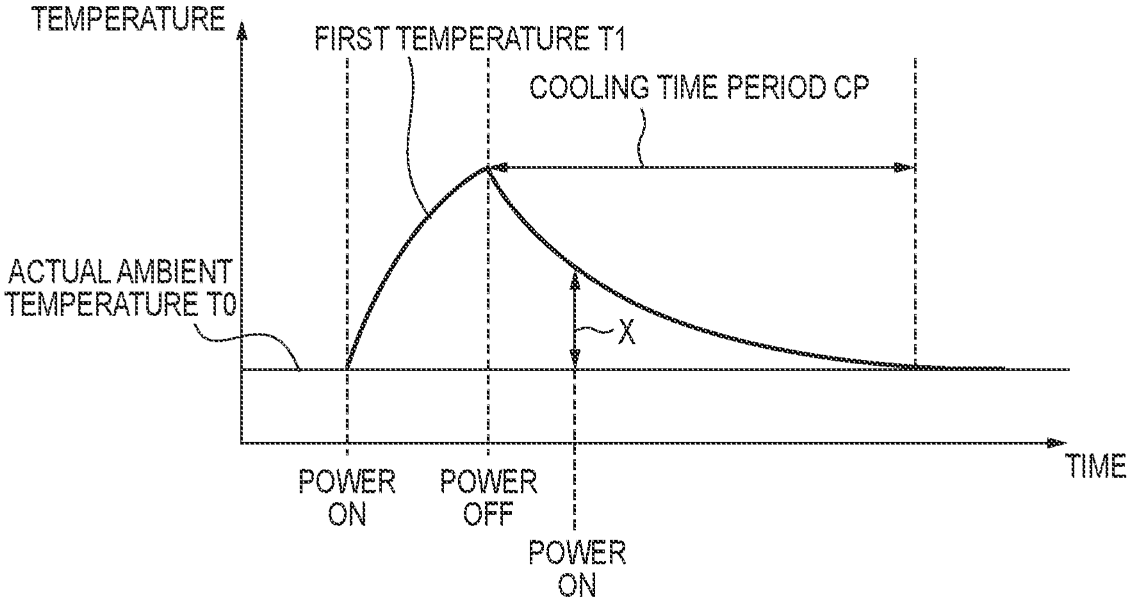

Next, with reference to FIG. 3B, a description is given of a case where the power of the digital camera 100 has been switched from OFF to ON at a timing at which the power OFF time period ΔPoff is shorter than the cooling time period CP (ΔPoff<CP).

In this case, it is estimated that the first temperature T1 is higher than the actual ambient temperature T0. Provided that the temperature difference between the first temperature T1 and the actual ambient temperature T0 in this case is X, the actual ambient temperature T0 can be calculated from the following Equation 2. In this case, the temperature difference X is determined from a time difference between the cooling time period CP and the power OFF time period ΔPoff. A method of determining the temperature difference X will be described later.

$$\text{Actual ambient temperature } T0 = \text{first temperature } T1 - \text{temperature difference} \times (\Delta Poff < CP) \quad \text{(Equation 2)}$$

In the foregoing manner, the actual ambient temperature T0 can be estimated from the first temperature T1 and the temperature difference X between the first temperature T1 and the actual ambient temperature T0.

<Control Processing>

Next, control processing according to the present embodiment will be described with reference to FIG. 4A to FIG. 6.

Figure 4A:
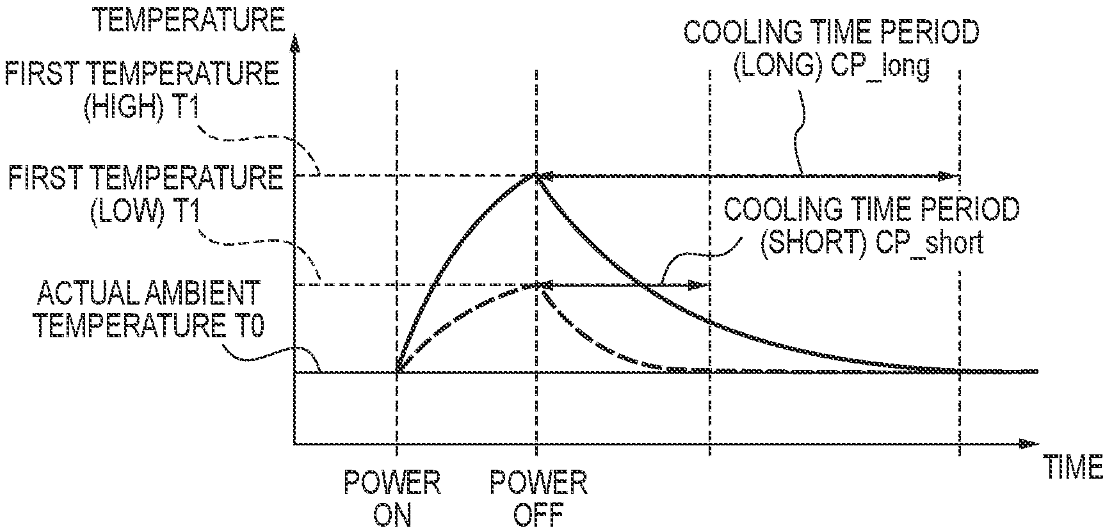
FIGS. 4A and 4B are diagrams illustrating a method of calculating an estimated ambient temperature according to the present embodiment.
Figure 4B:
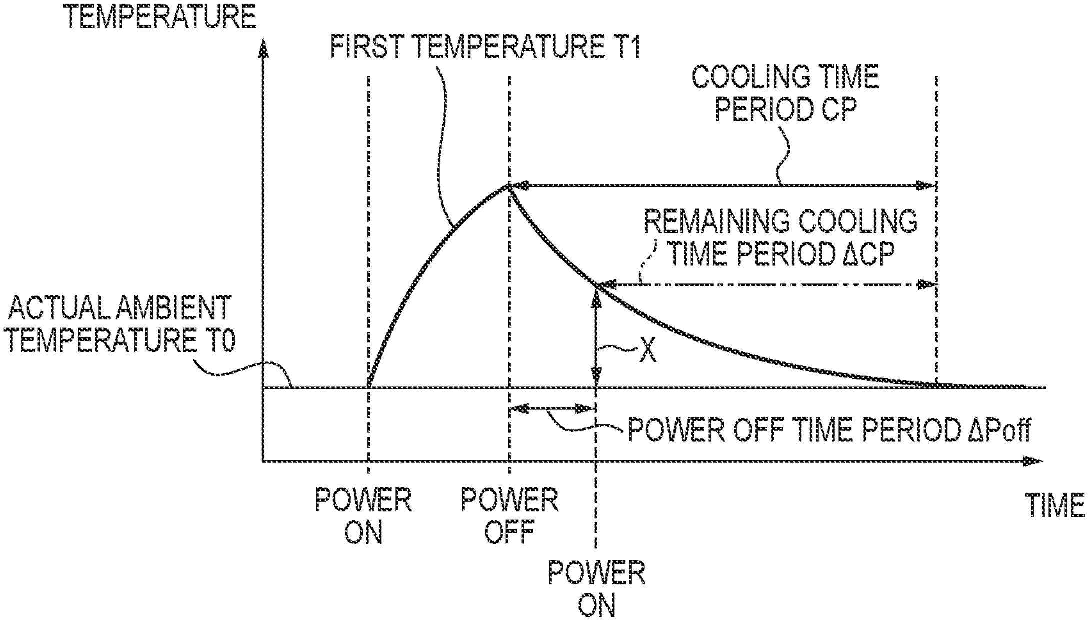
Figure 5A:
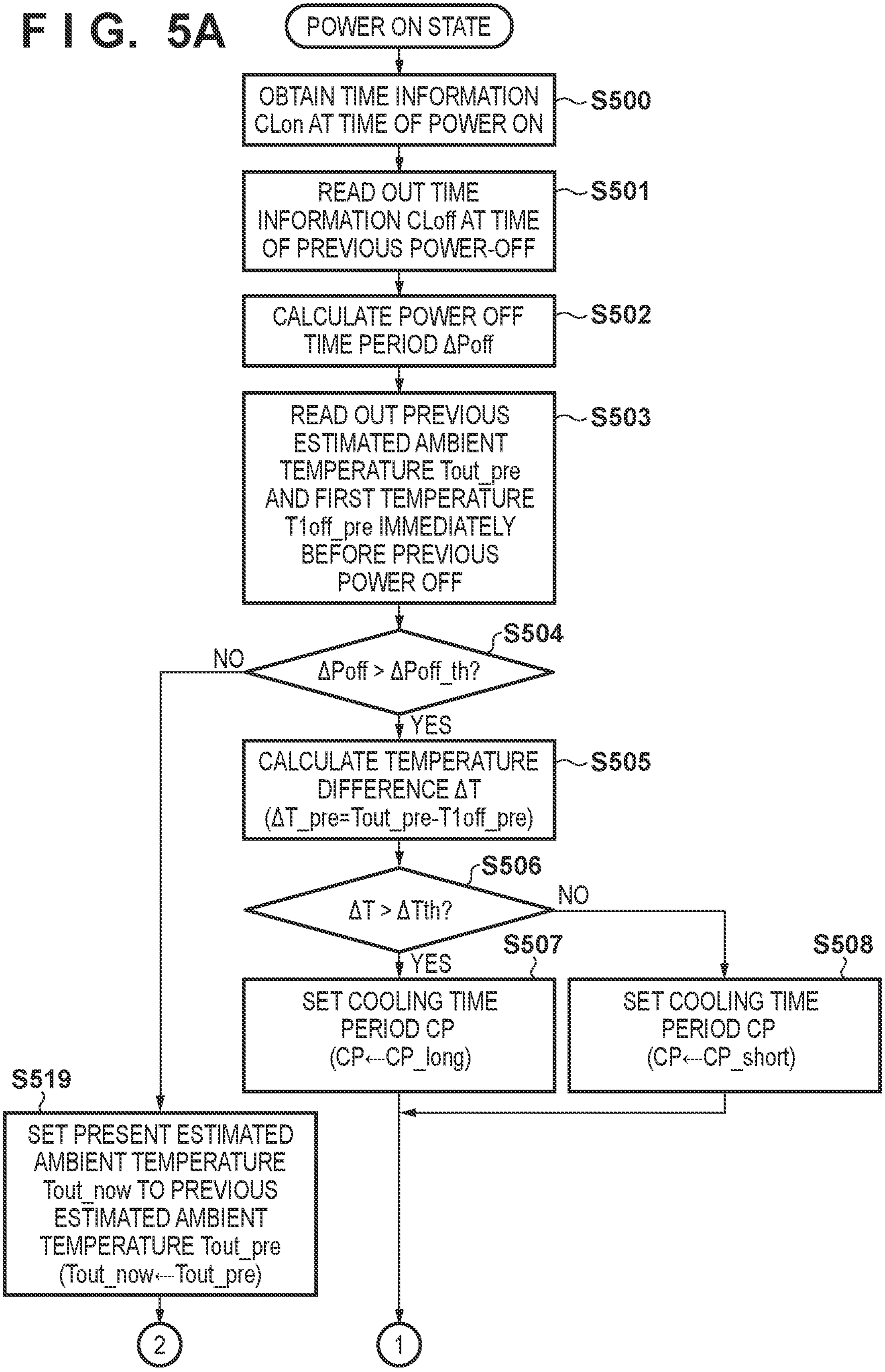
FIGS. 5A and 5B are flowcharts showing control processing of the electronic apparatus according to the present embodiment.
Figure 5B:
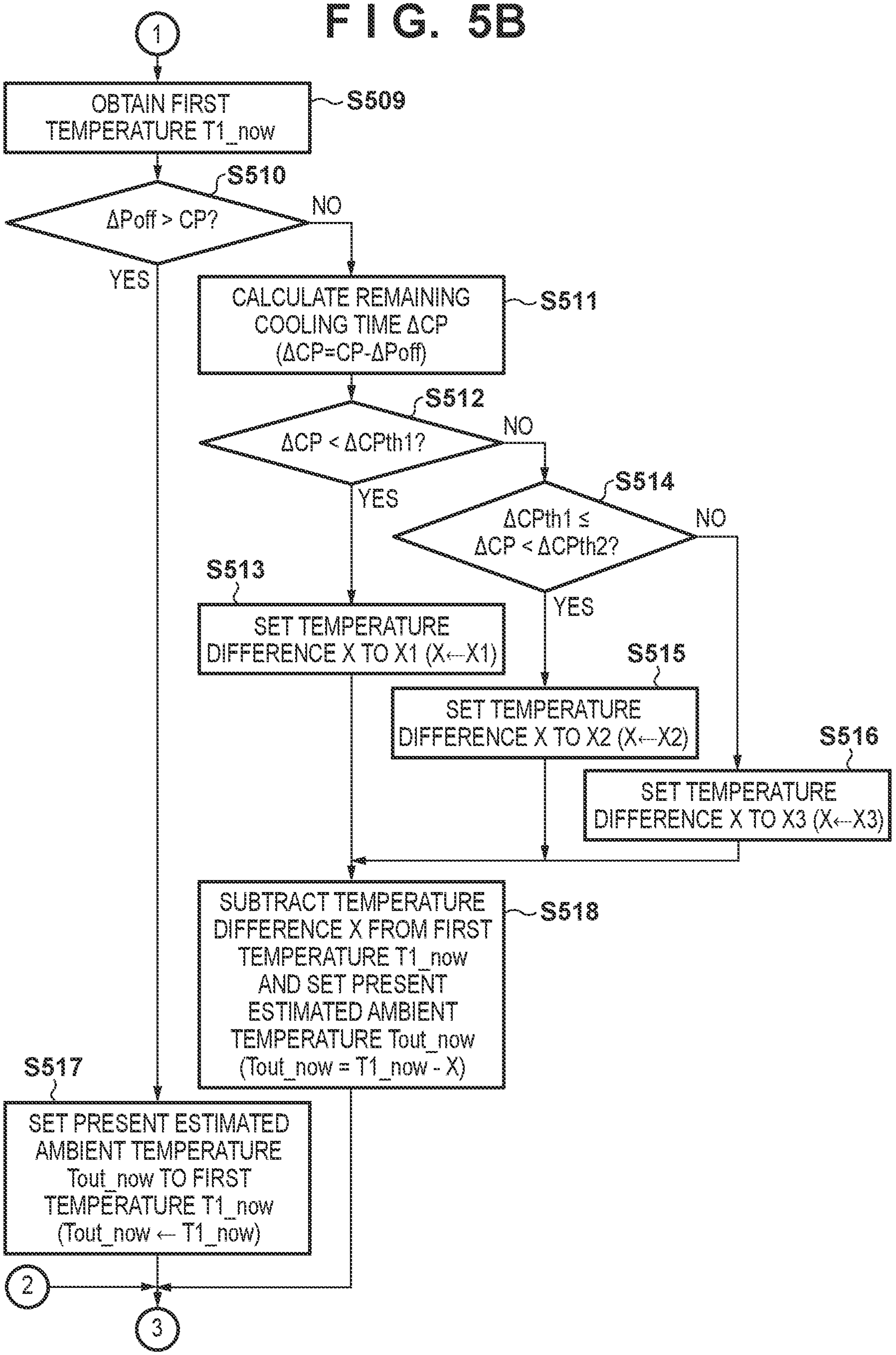
Figure 6:
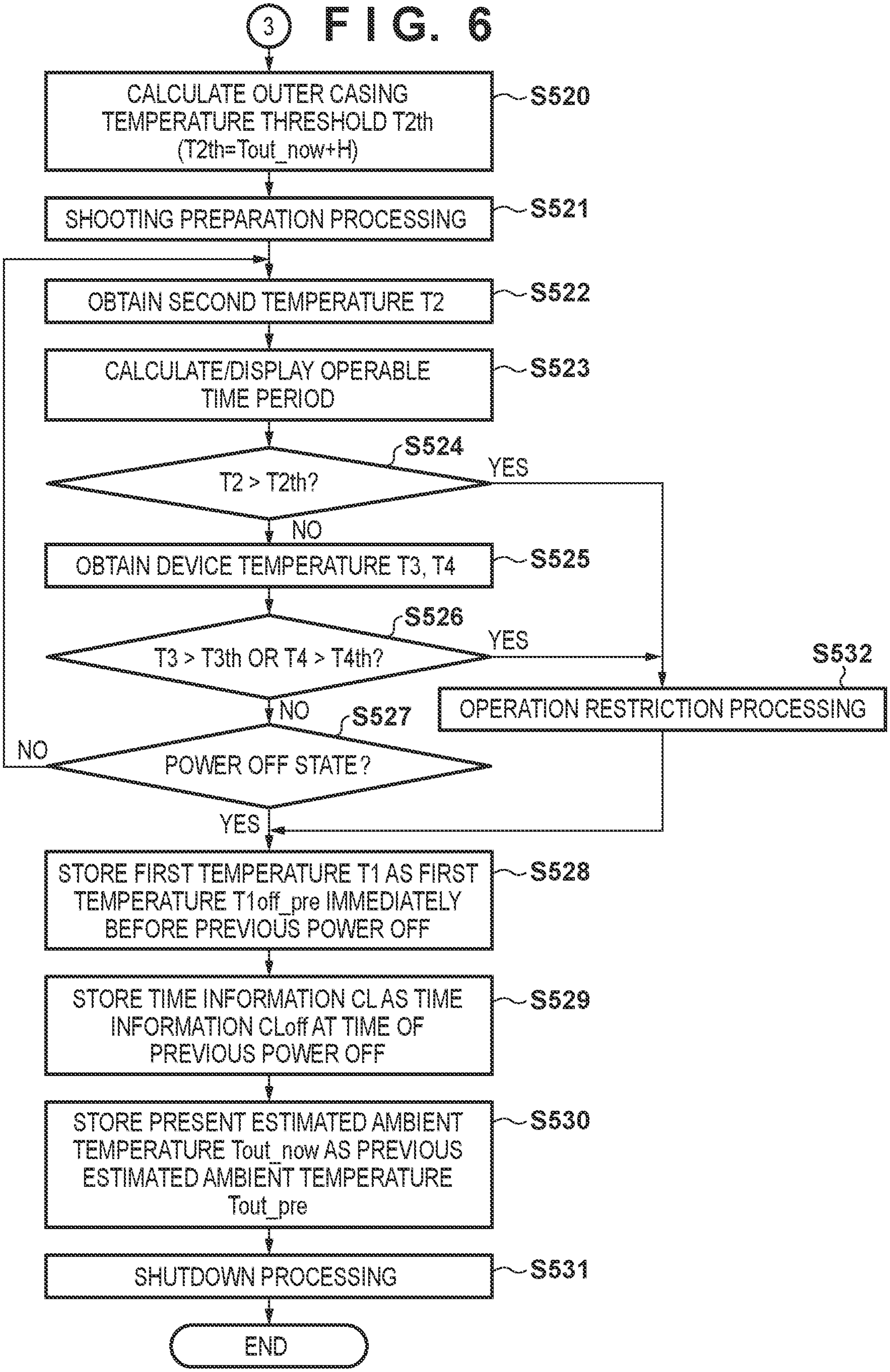
FIG. 6 is a flowchart showing control processing of the electronic apparatus according to the present embodiment.

FIGS. 4A and 4B show examples of changes in the actual ambient temperature T0, the first temperature T1, and the cooling time period CP in the control processing according to the present embodiment. FIGS. 5A, 5B and 6 are flowcharts showing the control processing of the digital camera 100 according to the present embodiment.

Processing of FIGS. 5A, 5B and 6 is executed when the control unit 101 has detected that the power switch 105 has been operated by a user for switching the digital camera 100 from power OFF state to power ON state. Note, it is assumed that prior to the start of processing of FIGS. 5A and 5B, the temperature inside the housing of the camera body 130 is the same as the actual ambient temperature T0, which is the real ambient temperature, and the first temperature T1 detected by the first thermometer 111 is also the same as the actual ambient temperature T0.

In step S500, the control unit 101 obtains time information from the timer unit 123, and stores the same into the working memory 117 as time information CLon at the time of initial activation.

In step S501, the control unit 101 reads out time information CLoff at the time of previous power-OFF from the nonvolatile memory 116, and stores the same into the working memory 117. At the time of initial activation of the digital camera 100 (when processing of FIGS. 5A and 5B is started first), an initial value (e.g., time information at the time of factory shipment or the like) is read out because time information CLoff at the time of previous power-OFF is not stored in the nonvolatile memory 116.

In step S502, the control unit 101 calculates a power OFF time period ΔPoff from the time of deactivation at which the power is turned OFF until the time of activation at which the power is turned ON, and stores the same into the working memory 117. The control unit 101 calculates the power OFF time period ΔPoff from the time information CLon at the time of initial activation and the time information CLoff at the time of previous power-OFF, which have been obtained in steps S500 and S501, respectively. In a case where the time information CLoff at the time of previous power-OFF is the initial value, the power OFF time period ΔPoff is considered to be zero.

In step S503, the control unit 101 reads out the previous estimated ambient temperature Tout_pre and the first temperature T1 off_pre immediately before the previous power-OFF from the nonvolatile memory 116, and stores them into the working memory 117. At the time of initial activation of the digital camera 100, the previous estimated ambient temperature Tout_pre and the first temperature T1 off_pre immediately before the previous power-OFF are set at, for example, 23° C., and stored into the working memory 117.

Once the power of the digital camera 100 has been switched from ON to OFF, the first temperature T1 starts to decrease; however, the amount of decrease in the first temperature T1 is small when the power OFF time period ΔPoff is short. There is a case where, in consideration of variations in the detection results of the first thermometer 111, it is more favorable to use the previous estimated ambient temperature Tout_pre as the present estimated ambient temperature Tout than to newly calculate an estimated ambient temperature Tout, depending on the power OFF time period ΔPoff. For example, a threshold ΔPoff_th for the power OFF time period ΔPoff is obtained through an experiment or the like and stored into the nonvolatile memory 116 in advance. Then, in a case where the power OFF time period ΔPoff is equal to or shorter than the threshold ΔPoff_th, the previous estimated ambient temperature Tout_pre is used as the present estimated ambient temperature Tout.

In order to perform the foregoing control, in step S504, the control unit 101 compares the power OFF time period ΔPoff calculated in step S502 with the threshold ΔPoff_th. When the control unit 101 has determined that the power OFF time period ΔPoff is longer than the threshold ΔPoff_th, the control unit 101 proceeds the processing to step S505. When the control unit 101 has determined that the power OFF time period ΔPoff is equal to or shorter than the threshold ΔPoff_th, the control unit 101 proceeds the processing to step S519.

In step S519, the control unit 101 sets the previous estimated ambient temperature Tout_pre obtained in step S503 as the present estimated ambient temperature Tout_now, and stores the same into the working memory 117. In this way, processing of steps S504 to S519 improves the accuracy of estimation of the ambient temperature in a case where the power OFF time period ΔPoff is short. Note that at the time of initial activation, as the power OFF time period ΔPoff is zero in step S502, the control unit 101 causes processing to proceed to step S505.

In step S505, the control unit 101 calculates a temperature difference ΔT between the previous estimated ambient temperature Tout_pre and the first temperature T1 off_pre immediately before the previous power-OFF, which have been obtained in step S503 (Tout_pre−T1off_pre), and stores the same into the working memory 117.

A description is now given of power consumed by the control unit 101 while the power is ON with reference to FIG. 4A.

Regarding power consumed by the control unit 101, in the moving image shooting mode for example, consumed power and the amount of heat generation in a case where moving images are shot at a high frame rate tend to be larger than consumed power and the amount of heat generation in a case where moving images are shot at a low frame rate. Therefore, even with the same shooting mode, the first temperature T1 at the time of power-OFF may vary due to the difference in shooting operations even when the time period of the power-ON state is the same, as shown in FIG. 4A. It can be estimated that the larger the difference between the first temperature T1 and the actual ambient temperature T0 at the time of power-OFF, the longer the cooling time period CP. Therefore, as shown in FIG. 4A, a cooling time period (long) CP_long for a case where the first temperature T1 at the time of power-OFF is a first temperature T1 (high) is longer than a cooling time period (short) CP_short for a case where the first temperature T1 at the time of power-OFF is a first temperature T1 (low).

In the present embodiment, the cooling time period (long) CP_long for the case of the first temperature T1 (high) and the cooling time period (short) CP_short for the case of the first temperature T1 (low) are obtained through an experiment or the like and stored into the nonvolatile memory 116 in advance. Then, the cooling time period CP after the power-OFF is determined in accordance with the temperature difference ΔT between the first temperature T1 off_pre immediately before the previous power-OFF and the previous estimated ambient temperature Tout_pre. In this way, the cooling time period CP can be determined with higher accuracy.

In step S506, the control unit 101 compares the temperature difference ΔT calculated in step S505 with a threshold ΔTth. The threshold ΔTth is obtained through an experiment or the like and stored into the nonvolatile memory 116 in advance. When the control unit 101 has determined that the temperature difference ΔT is larger than the threshold ΔTth, the control unit 101 proceeds the processing to step S507. When the control unit 101 has determined that the temperature difference ΔT is equal to or smaller than the threshold ΔTth, the control unit 101 proceeds the processing to step S508.

In step S507, the control unit 101 sets the cooling time period (long) CP_long as the cooling time period CP for the temperature T1 after the power-OFF.

In step S508, the control unit 101 sets the cooling time period (short) CP_short as the cooling time period CP for the first temperature T1 after the power-OFF.

Note that a plurality of thresholds ΔTth may be prepared, and cooling time periods CP of different lengths may be set for the respective thresholds ΔTth. Then, the cooling time periods CP may be set for the respective thresholds ΔTth.

Furthermore, as the cooling time period CP has a correlation with the temperature difference ΔT, the cooling time period CP may be calculated using the following Equation 3.

$$\text{Cooling time period } CP = \alpha e^{\wedge}(\beta \times \Delta T) \quad \text{(Equation 3)}$$

α and β denote constants, e denotes a natural number, and ^ denotes exponentiation.

In addition, as it is considered that the cooling time period CP changes significantly in accordance with the actual ambient temperature T0, which is the environment in which the digital camera 100 is used, the cooling time period CP may be determined in accordance with the previous estimated ambient temperature Tout_pre and the temperature difference ΔT. In this case, for example, the cooling time period CP is calculated using Equation 3 that has been prepared for each of the values obtained by comparing the previous estimated ambient temperature Tout_pre with the thresholds. In this way, the cooling time period CP can be determined with higher accuracy in a case where the cooling time period CP is dependent on the actual ambient temperature T0.

In step S509, the control unit 101 obtains a first temperature T1_now from the first thermometer 111, and stores the same into the working memory 117 as an interim ambient temperature Tout_now.

In step S510, the control unit 101 reads out the power OFF time period ΔPoff calculated in step S502 and the cooling time period CP set in step S507 or S508 from the working memory 117, and compares them with each other. The control unit 101 determines whether the power OFF time period ΔPoff calculated in step S502 is longer than the cooling time period CP set in step S507 or S508. When the control unit 101 has determined that the power OFF time period ΔPoff calculated in step S502 is longer than the cooling time period CP set in step S507 or S508, the control unit 101 proceeds the processing to step S517. When the control unit 101 has determined that the power OFF time period ΔPoff calculated in step S502 is not longer than the cooling time period CP set in step S507 or S508, the control unit 101 proceeds the processing to step S511.

In step S511, the control unit 101 calculates a remaining cooling time period ΔCP, which is the difference between the cooling time period CP and the power OFF time period ΔPoff (CP−ΔPoff), and stores the same into the working memory 117.

With reference to FIG. 4B, the following describes a change in the state of the temperature difference X between the first temperature T1 and the actual ambient temperature T0 in a case where the power has been turned ON before the elapse of the cooling time period CP since the power has been switched from ON to OFF.

As the temperature difference X has a correlation with the remaining cooling time period ΔCP, the temperature difference X can be determined in accordance with the length of the remaining cooling time period ΔCP.

In the present embodiment, the remaining cooling time period ΔCP calculated in step S511 is compared with a first threshold ΔCPth1 and a second threshold ΔCPth2 (>the first threshold ΔCPth1) that have been preset (steps S512 and S514), and one of a first value X1, a second value X2, and a third value X3 that have been preset is determined as the temperature difference X (X1<X2<X3) in accordance with the comparison result. Note that as the remaining cooling time period ΔCP has a correlation with the temperature difference X, the cooling time period CP may be calculated using the above-described Equation 3. Note that the first threshold ΔCPth1 is a value smaller than the second threshold ΔCPth2. The shorter the time period between the time of power-ON and the remaining cooling time period ΔCP, the smaller the value determined as the temperature difference X.

In step S512, the control unit 101 compares the remaining cooling time period ΔCP calculated in step S511 with the first threshold ΔCPth1 and determines whether the remaining cooling time period ΔCP calculated in step S511 is shorter than the first threshold ΔCPth1. When the control unit 101 has determined that the remaining cooling time period ΔCP calculated in step S511 is shorter than the first threshold ΔCPth1, the control unit 101 proceeds the processing to step S513. When the control unit 101 has determined that the remaining cooling time period ΔCP calculated in step S511 is not shorter than the first threshold ΔCPth1, the control unit 101 proceeds the processing to step S514.

In step S514, the control unit 101 compares the remaining cooling time period ΔCP calculated in step S511 with the first threshold ΔCPth1 and the second threshold ΔCPth2 and determines whether the remaining cooling time period ΔCP calculated in step S511 is equal to or longer than the first threshold ΔCPth1 and is shorter than the second threshold ΔCPth2. When the control unit 101 has determined that the remaining cooling time period ΔCP calculated in step S511 is equal to or longer than the first threshold ΔCPth1 and shorter than the second determination threshold ΔCPth2 (ΔCPth1≤ΔCP<ΔCPth2), the control unit 101 proceeds the processing to step S515. When the control unit 101 has determined that the remaining cooling time period ΔCP calculated in step S511 is not shorter than the second determination threshold ΔCPth2 (ΔCPth2≤ΔCP), the control unit 101 proceeds the processing to step S516.

In step S513, the control unit 101 sets the first value X1 as the temperature difference ΔT between the first temperature T1 and the actual ambient temperature T0, and stores the same into the working memory 117.

In step S515, the control unit 101 sets the second value X2 as the temperature difference ΔT between the first temperature T1 and the actual ambient temperature T0, and stores the same into the working memory 117.

In step S516, the control unit 101 sets the third value X3 as the temperature difference X between the first temperature T1 and the actual ambient temperature T0, and stores the same into the working memory 117.

In step S517, the control unit 101 sets the first temperature T1_now obtained in step S509 as the present estimated ambient temperature Tout_now based on the above-described Equation 1, and stores the same into the working memory 117.

In step S518, the control unit 101 calculates the present estimated ambient temperature Tout_now based on the above-described Equation 2, and stores the same into the working memory 117. The control unit 101 calculates the present estimated ambient temperature Tout_now by subtracting the temperature difference X set in step S513 from the first temperature T1_now obtained in step S509.

In processing of FIG. 6, which follows processing of FIGS. 5A and 5B, processing for restricting the operations of the digital camera 100 based on the present estimated ambient temperature Tout_now set in step S517, S518, or S519 and on the second temperature T2, which corresponds to the outer casing temperature of the camera body 130, is executed.

In step S520, the control unit 101 calculates an outer casing temperature threshold T2th and stores the same into the working memory 117. Based on the following Equation 4, the control unit 101 calculates the outer casing temperature threshold T2th by adding a constant H to the present estimated ambient temperature Tout_now set in step S517, S518, or S519.

$$\text{Outer casing temperature threshold } T2th = \text{present estimated ambient temperature Tout\_now} + H \qquad \text{(Equation 4)}$$

The constant H is a fixed value (e.g., 20° C.).

In step S521, the control unit 101 executes shooting preparation processing of the digital camera 100. The control unit 101 starts driving of the image capturing unit 102, and displays image data captured by the image capturing unit 102 as a live view on the display unit 107. This causes the image capturing unit 102 to be activated, and increases a processing load of the control unit 101, thereby increasing power consumed by the digital camera 100 and the amount of heat generation therein. Once the shooting preparation processing has been completed, shooting of still images or shooting of moving images can be performed; in subsequent steps S522 to S527, the still image shooting processing corresponding to a user operation on the still image shooting button 103, or the moving image shooting processing corresponding to a user operation on the moving image shooting button 106, is executed in parallel.

In step S522, the control unit 101 obtains the second temperature T2 from the second thermometer 112, and stores the same into the working memory 117 as the outer casing temperature.

In step S523, the control unit 101 calculates an operable time period (in the case of a shooting mode, a shootable time period) based on the outer casing temperature threshold T2th calculated in step S520 and on the second temperature T2 obtained in step S522, and displays the same on the display unit 107. The operable time period is calculated from, for example, the following Equation 5.

$$\text{Operable time period} = \alpha \ln\left[(\beta - \text{outer casing temperature threshold } T2th)/(\beta - \text{second temperature } T2)\right] \qquad \text{(Equation 5)}$$

α and β denote constants, and ln denotes a natural logarithm.

In step S524, the control unit 101 compares the outer casing temperature threshold T2th calculated in step S520 with the second temperature T2 obtained in step S522 and determines whether the second temperature T2 is higher than the outer casing temperature threshold T2th. When the control unit 101 has determined that the second temperature T2 is not higher than the outer casing temperature threshold T2th, the control unit 101 proceeds the processing to step S525; when the control unit 101 has determined that the second temperature T2 is higher than the outer casing temperature threshold T2th, the control unit 101 proceeds the processing to step S532. In this case, notifying the user of the operable time period of the digital camera 100 until the second temperature T2, which is the outer casing temperature of the digital camera 100, reaches the outer casing temperature threshold T2th in step S524 enables the user to confirm the shootable time period in a shooting mode, for example.

In step S525, the control unit 101 stores the third device temperature T3 obtained from the third thermometer 113 and the fourth device temperature T4 obtained from the fourth thermometer 114 into the working memory 117.

In step S526, the control unit 101 compares the third device temperature T3 obtained in step S525 with a third device temperature threshold T3th and determines whether the third device temperature T3 is higher than a third device temperature threshold T3th. The third device temperature threshold T3th is an upper limit temperature for guaranteeing the operations of the control unit 101, which is the heat source device. The third device temperature threshold T3th is a fixed value, and is set at 70° C., for example. When the control unit 101 has determined that the third device temperature T3 is higher than the third device temperature threshold T3th, the control unit 101 proceeds the processing to step S532, the control unit 101 proceeds the processing to step S527. In this case, notifying the user of the operable time period of the digital camera 100 until the device temperature T3 reaches the device temperature threshold T3th in step S526 enables the user to confirm the shootable time period in a shooting mode, for example.

Furthermore, the control unit 101 compares the fourth device temperature T4 obtained in step S525 with a fourth device temperature threshold T4th and determines whether the fourth device temperature T4 is higher than a fourth device temperature threshold T4th. The fourth device temperature threshold T4th is an upper limit temperature for guaranteeing the operations of the image capturing unit 102, which is the heat source device. The fourth device temperature threshold T4th is a fixed value, and is set at 80° C., for example. When the control unit 101 has determined that the fourth device temperature T4 is higher than the fourth device temperature threshold T4th, the control unit 101 proceeds the processing to step S532. When the control unit 101 has determined that the fourth device temperature T4 is not higher than the fourth device temperature threshold T4th, the control unit 101 proceeds the processing to step S527.

Note that although the control unit 101 and the image capturing unit 102 have been exemplarily described as the heat source devices for which the determination of step S526 is made in the present embodiment, no limitation is intended by this; in a case where there is a heat source device other than the control unit 101 and the image capturing unit 102, a comparison with a device temperature threshold may be similarly made also with respect to another heat source device.

In step S527, the control unit 101 determines whether the power switch 105 has been operated for switching the digital camera 100 from power ON state to power OFF state. When the control unit 101 has determined that the power switch 105 has been switched from ON to OFF, the control unit 101 proceeds the processing to step S528. When the control unit 101 has determined that the power switch 105 has not been switched from ON to OFF, the control unit 101 returns the processing to step S522 and is continued.

In step S528, the control unit 101 obtains the first temperature T1 from the first thermometer 111, and stores the same into the nonvolatile memory 116 as the first temperature T1 immediately before the previous power-OFF.

In step S529, the control unit 101 obtains time information CL from the timer unit 123, and stores the same into the nonvolatile memory 116 as time information CLoff at the time of previous power-OFF.

In step S530, the control unit 101 stores the present estimated ambient temperature Tout_now set in step S517, S518, or S519 into the nonvolatile memory 116 as the previous estimated ambient temperature Tout_pre.

In step S531, the control unit 101 executes shutdown processing. Here, the control unit 101 stops a power supply to the image capturing unit 102 and the display unit 107, for example.

In step S532, the control unit 101 executes processing for restricting the operations of the digital camera 100. Here, for example, the control unit 101 displays, on the display unit 107, information for providing the user with a notification indicating that a shutdown is to be performed as a result of the second temperature T2 reaching the outer casing temperature threshold T2th or the device temperature T3 or T4 reaching the device temperature threshold T3th or T4th; then, after a predetermined time period has elapsed since the display, shutdown processing similar to that of step S531 is executed.

As described above, according to the present embodiment, when the power has been switched from OFF to ON, when the power OFF time period ΔPoff is longer than the predetermined cooling time period CP, it is determined that the inside of the housing has been sufficiently cooled, and the first temperature T1 is set as the estimated ambient temperature Tout, whereas when the power OFF time period is shorter than the predetermined cooling time period CP, it is determined that the inside of the housing has not been sufficiently cooled, and the estimated ambient temperature Tout is calculated by correcting the first temperature T1 in accordance with the power OFF time period ΔPoff. In this way, the accuracy of estimation of the ambient temperature can be improved using a method that is simpler than conventional methods, and an appropriate temperature can be set as an operation restriction temperature for the digital camera 100, thereby extending the operable time period of the digital camera 100 to the fullest.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-042317, filed Mar. 16, 2023 which is hereby incorporated by reference herein in its entirety.

What is claimed is:

1. An electronic apparatus comprising:

a first thermometer that detects a first temperature corresponding to an ambient temperature of an environment in which the electronic apparatus is used;

a processor; and a memory storing a program that, when executed by the processor, causes the electronic apparatus to function as:

an obtainment unit that, when the electronic apparatus has been switched from a power-OFF state to a power-ON state, obtains a first time period that is a time period from when the electronic apparatus has been placed in the power-OFF state until when the electronic apparatus has been switched to the power-ON state; and a temperature estimation unit that, when the electronic apparatus has been switched to the power-ON state, obtains an estimated ambient temperature by estimating an ambient temperature based on a second time period and on the first temperature, the second time period being a time period required for the first temperature to decrease to an ambient temperature after the electronic apparatus has been placed in the power-OFF state, wherein in a case where the first time period obtained by the obtainment unit is longer than the second time period, the temperature estimation unit obtains the first temperature as the estimated ambient temperature, and in a case where the first time period obtained by the obtainment unit is not longer than the second time period, the temperature estimation unit obtains the estimated ambient temperature based on the first temperature and on a temperature difference between the first temperature and the ambient temperature corresponding to a time difference between the first time period and the second time period.

2. The electronic apparatus according to claim 1, wherein in a case where the first time period is not longer than the second time period, the temperature estimation unit obtains the estimated ambient temperature based on the temperature difference corresponding to a magnitude of the time difference and on the first temperature.

3. The electronic apparatus according to claim 2, wherein in a case where the first time period is not longer than the second time period, the temperature estimation unit sets a temperature obtained by subtracting the temperature difference corresponding to the magnitude of the time difference from the first temperature as the estimated ambient temperature, and the temperature estimation unit subtracts a first temperature difference from the first temperature in a case where the time difference is smaller than a first threshold, and subtracts a second temperature difference that is smaller than the first temperature difference from the first temperature in a case where the time difference is smaller than a second threshold that is smaller than the first threshold.

4. The electronic apparatus according to claim 1, wherein the temperature estimation unit obtains the temperature difference corresponding to the time difference based on a difference between a previous estimated ambient temperature obtained during a previous power-ON state that precedes when the electronic apparatus has been placed in the power-OFF state and the first temperature immediately before the electronic apparatus has been placed in the power-OFF state, and on a predetermined expression.

5. The electronic apparatus according to claim 1, wherein in a case where the first time period is not longer than a predetermined threshold, the temperature estimation unit obtains, as the estimated ambient temperature, a previous estimated ambient temperature obtained during a previous power-ON state that precedes when the electronic apparatus has been placed in the power-OFF state.

6. The electronic apparatus according to claim 1, wherein the temperature estimation unit determines the second time period based on a difference between a previous estimated ambient temperature obtained during a previous power-ON state that precedes when the electronic apparatus has been placed in the power-OFF state and the first temperature immediately before the electronic apparatus has been placed in the power-OFF state.

7. The electronic apparatus according to claim 1, further comprising:

a second thermometer that detects a second temperature corresponding to a temperature of an outer casing of the electronic apparatus;

wherein the program, when executed by the CPU, further causes the electronic apparatus to function as:

a control unit that sets a threshold for an outer casing temperature of the electronic apparatus based on the estimated ambient temperature obtained by the temperature estimation unit, and performs control to restrict an operation of the electronic apparatus when the second temperature has reached the threshold.

8. The electronic apparatus according to claim 7, further comprising:

a heat source device, wherein the control unit performs the control to restrict the operation of the electronic apparatus when a temperature of the heat source device has reached a threshold for the heat source device.

9. The electronic apparatus according to claim 8, further comprising:

an image sensor, wherein the image sensor functions as the heat source device.

10. The electronic apparatus according to claim 1, wherein the electronic apparatus is a hand-held electronic apparatus.

11. A control method for an electronic apparatus, wherein the electronic apparatus comprises:

a first thermometer that detects a first temperature corresponding to an ambient temperature of an environment in which the electronic apparatus is used, wherein the control method comprises:

when the electronic apparatus has been switched from a power-OFF state to a power-ON state, obtaining a first time period that is a time period from when the electronic apparatus has been placed in the power-OFF state until when the electronic apparatus has been switched to the power-ON state;

when the electronic apparatus has been switched to the power-ON state, obtaining an estimated ambient temperature by estimating an ambient temperature based on a second time period and on the first temperature, the second time period being a time period required for the first temperature to decrease to an ambient temperature after the electronic apparatus has been placed in the power-OFF state; and in a case where the first time period is longer than the second time period, obtaining the first temperature as the estimated ambient temperature, and in a case where the first time period is not longer than the second time period, obtaining the estimated ambient temperature based on the first temperature and on a temperature difference between the first temperature and the ambient temperature corresponding to a time difference between the first time period and the second time period.

12. A non-transitory computer-readable storage medium storing a program for causing a computer to function as an electronic apparatus comprising:

a first thermometer that detects a first temperature corresponding to an ambient temperature of an environment in which the electronic apparatus is used;

a processor; and a memory storing a program that, when executed by the processor, causes the electronic apparatus to function as:

an obtainment unit that, when the electronic apparatus has been switched from a power-OFF state to a power-ON state, obtains a first time period that is a time period from when the electronic apparatus has been placed in the power-OFF state until when the electronic apparatus has been switched to the power-ON state; and a temperature estimation unit that, when the electronic apparatus has been switched to the power-ON state, obtains an estimated ambient temperature by estimating an ambient temperature based on a second time period and on the first temperature, the second time period being a time period required for the first temperature to decrease to an ambient temperature after the electronic apparatus has been placed in the power-OFF state, wherein in a case where the first time period obtained by the obtainment unit is longer than the second time period, the temperature estimation unit obtains the first temperature as the estimated ambient temperature, and in a case where the first time period obtained by the obtainment unit is not longer than the second time period, the temperature estimation unit obtains the estimated ambient temperature based on the first temperature and on a temperature difference between the first temperature and the ambient temperature corresponding to a time difference between the first time period and the second time period.

* * * * *